Sept. 21, 1965 A. ELOVIC 3,208,053

SPLIT-ARRAY CORE MEMORY SYSTEM

Filed June 14, 1961 2 Sheets-Sheet 1

FIG. I

INVENTOR.
Alexander Elovic
BY
Brene, Pundes & Darr
ATTORNEYS

Sept. 21, 1965 A. ELOVIC 3,208,053

SPLIT-ARRAY CORE MEMORY SYSTEM

Filed June 14, 1961 2 Sheets-Sheet 2

INVENTOR.
Alexander Elovic

BY

Breene, Pauley & Dunn

ATTORNEYS

United States Patent Office 3,208,053
Patented Sept. 21, 1965

3,208,053

SPLIT-ARRAY CORE MEMORY SYSTEM

Alexander Elovic, Elizabeth, N.J., assignor to Indiana General Corporation, Valparaiso, Ind., a corporation of Indiana Filed June 14, 1961, Ser. No. 117,065
8 Claims. (Cl. 340—174)

This invention relates generally to memory systems incorporating sizable coincident current magnetic core arrays, and more particularly relates to novel circuits and arrangements for operating the inhibit windings thereof.

In large capacity memory systems, the size of each core matrix or array often exceeds the capability of practical inhibit drivers. In other words, the use of a single inhibit winding for each of the $n$ core arrays of the memory system would be impractical and uneconomical for the requisite driver power. In such memory systems it is therefore usual to split each core array into a reasonable number of sections, e.g., two, four, or more. Each such matrix section is wound with an individual inhibit winding, resulting in $m$ windings in each core array.

A split-array core memory system thus contains $m \times n$ inhibit windings. Heretofore, each of these inhibit windings were operated or driven by an individual inhibit driver in performing the inhibit function for the memory. This resulted in costly multiplication of equipment. The present invention is primarily concerned with simplification of the overall inhibit drive arrangement for such split-array memory systems.

In accordance with is invention only one basic inhibit drive circuit is used for each of the $n$ split arrays. Each of these $n$ drive circuits includes a fast-acting electronic switch connected to each inhibit winding of its associated array section. There are thus $m$ electronic switches connected to or otherwise directly controlled by each individual drive circuit. However, only one of the $m$ switches is synchronized to be capable of operation upon any inhibit pulse actuation by the associated driver. The operative switch directs or steers the inhibit pulse to the appropriate inhibit winding of the particular split array, with negligible distortion or delay.

Further, the corresponding switches of each split array are coupled together for unitary selection or address as $m$ separate switch groups. In this manner, only a corresponding inhibit winding location, of the $m$ sections, in each array, is rendered operative by selective address through the $m$ switch groups. The present invention is applicable to sequential address or random access to the cores of the memory. The switch groups are addressed to correspond to the array-section location of the addressed cores.

The invention inhibit system is thus economical of driver power, components and circuitry for split-array memories. Each inhibit driver section need have a current or power capacity to drive only one of the $m$ inhibit windings at any cycle with an inhibiting pulse. The fast-acting switches, in the $m$ groupings, are synchronized to direct each inhibit pulse to the proper inhibit winding of the associated arrays. Further, the invention circuitry provides for substantially uniform loading on the power supply by each inhibit driver arrangement hereof.

The above and other advantages, features and objects of this invention will become apparent from the following description of an exemplary embodiment thereof, taken in conjunction with the drawings, in which.

Figure 1:
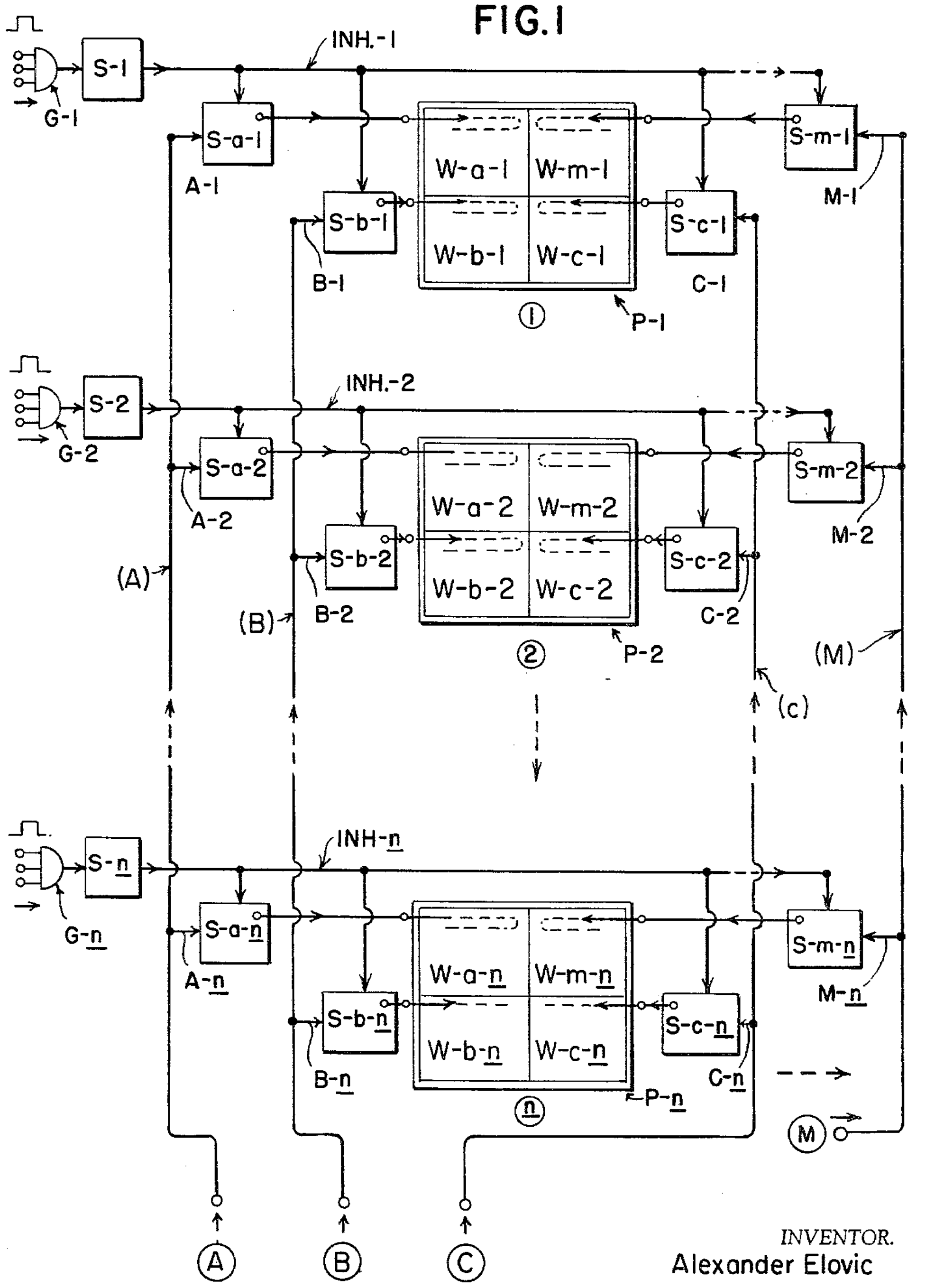
FIG. 1 is a schematic block diagram of the exemplary split-array core memory system.

The core arrays P–1, P–2 . . . P–$n$ provide the $n$ bits of the word capacity of the memory system. Each core array (P) is divided or split into $m$ reasonably sized sections, each with an inhibit winding (W). While uniformly sized sections are preferred, such are not necessary. It is understood that conventionally arranged magnetic cores are employed in the exemplary system, with the usual $x$ and $y$ drive selection wires, and sense windings for coincident current operation.

The plural inhibit windings (W) for teach array (P) are identified by their section positions: $a$, $b$, $c$ . . . $m$; and by the array location: 1, 2 . . . $n$. Thus, the $m$ inhibit windings for the first array P–1 are: W–$a$–1, W–$b$–1, W–$c$–1 . . . W–$m$–1; for the second array P–2: W–$a$–2, W–$b$–2, W–$c$–2 . . . W–$m$–2; and so forth, until the $n$th array P–$n$: W–$a$–$n$; W–$b$–$n$; W–$c$–$n$ . . . W–$m$–$n$.

Each split array core (P) has an individual inhibit drive circuit inclusive of the inhibit drive lines: INH.–1, INH.–2 . . . INH.–$n$. An inhibit pulse is selectively impressed on the INH. drive lines whenever an inhibit action is to be performed in the associated arrays (P). Each inhibit drive line (INH.) is connected to the output of an individual inhibit driver (S) that is responsive to signal pulses, coded among the $n$ arrays. Thus, the input of each driver (S) is coupled to an AND gate (G) capable of impressing the pulses thereon. The gates (G) in turn are connected in the overall system to synchronously effect the inhibit pulsing for the drivers (S), in a manner well known in the art.

The inhibit drives are thereby individually effected for the $n$ arrays as follows: for array P–1, through inhibit drive line INH.–1, inhibit driver S–1, and AND gate G–1; for array P–2, through corresponding line INH.–2, driver S–2, gate G–2; and similarly on through to the $n$th array P–$n$, through INH.–$n$, S–$n$, G–$n$. Each inhibit drive further includes an individual fast-acting switch for the inhibit windings (W) of the associated array (P).

The m inhibit winding switches for the first split-array P–1 are: S–$a$–1, S–$b$–1, S–$c$–1 . . . S–$m$–1, the outputs of which are respectively connected to drive their associated inhibit windings W–$a$–1, W–$b$–1, W–$c$–1 . . . W–$m$–1. The other split-arrays (P) have identical inhibit winding switches (S–$a$–, S–$b$–, . . . S–$m$) for their individual inhibit windings (W–$a$, W–$b$, . . . W–$m$).

The inhibit drive line (INH.) of each array (P) is connected to potentially actuate each of the winding switches (S–$a$, S–$b$ . . . S–$m$) in that array. In other words, when an inhibit pulse occurs in the INH. line, it creates a pulse signal that is selectively directed through a selected (addressed) one of the winding switches to the associated winding (W), in a manner to be set forth in detail hereinafter. Thus, for the first array P–1, the inhibit drive line INH.–1 is shown coupled directly to an input of each of the first array inhibit switches S–$a$–1, S–$b$–1, S–$c$–1 . . . S–$m$–1. In a similar manner, the other inhibit drive lines inH.–2 . . . INH.–$n$ connect with the winding switches (S–$a$, S–$b$ . . . S–$m$) in their array.

The section switches S–$a$, S–$b$, etc. are arranged in groups (A), (B), etc. corresponding to common locations of the associated inhibit windings (W) in the respective arrays (P). Thus, the switch (A) group is composed of section switches: S–$a$–1, S–$a$–2 . . . S–$a$–$n$; the (B) group, of switches: S–$b$–1, S–$b$–2 . . . S–$b$–$n$; and on to the (M) group: S–$m$–1, S–$m$–2 . . . S–$m$–$n$. An address line for each group (A), (B) . . . (M) connects to each section switch of the respective group, (see FIG. 1), and serves to selectively activate them as a group.

The group address lines (A), (B) . . . (M) are each capable of assuming a +V or a —V potential level with respect to signal ground for group selection. One group line (A), (B) . . . (M) is made —V for the selection function in the exemplary system, during any single inhibit pulse period or cycle, while all the others remain at the +V level. The coincidence of a pulse signal from an inhibit line (INH.) and a trigger pulse from a group address line (A, B . . . M) to any section switch (S–*a*, S–*b* . . . S–*m*) results in a rated inhibit pulse to flow through the associated inhibit winding (W). The trigger pulses are established by changing the potential of the group lines (A), (B) . . . (M) from +V to —V by selective address means known to those skilled in the art. Their triggering action on the section switches S–*a*, S–*b* . . . S–*m* are detailed hereinafter.

Figure 2:
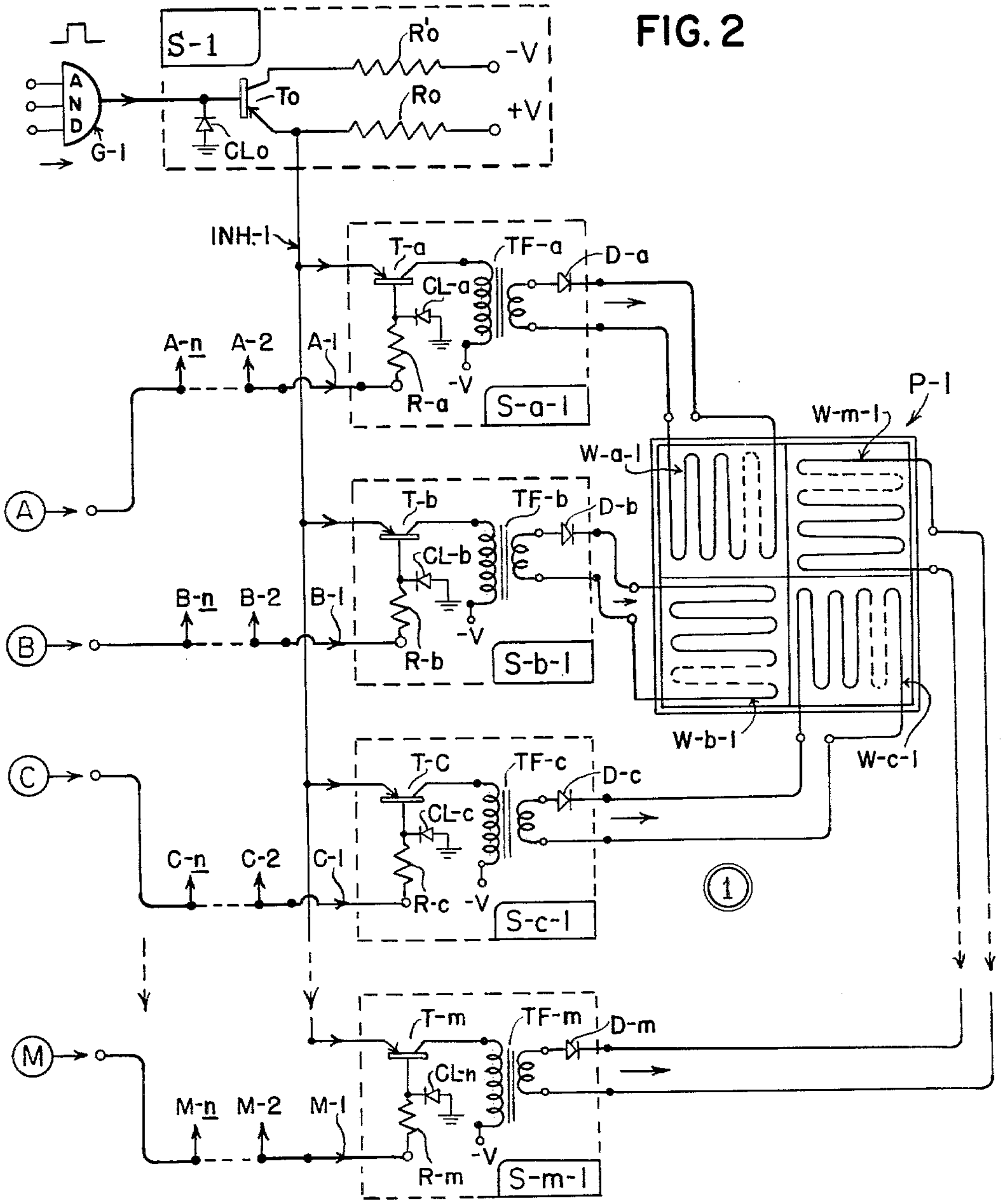
FIG. 2 is a schematic circuit diagram of the exemplary inhibit drive for one of the core arrays of the system.

FIG. 2 is a schematic diagram of circuitry to efficiently effect the operational features of the memory system hereof. Only the first (1) core array inhibit circuit arrangement is shown, it being understood that the others, for (2), . . . (*n*) are the same, as seen in system diagram, FIG. 1. The large magnetic core array P–1 is grouped into the *m* sections with individual inhibit windings W–*a*–1, W–*b*–1 . . . W–*m*–1.

A typical large array (P) may contain a matrix of say 4096 ferrite cores. If the inhibit circuits can practically only drive say 2048 cores then two sections per array are used, and $m=2$; and for 1024 cores, four sections, with $m=4$; etc. A separate inhibit winding for each section, results in *m* inhibit windings (W) per array (P). Only one winding (W) of each array may be pulsed during each cycle or pulse signal duration, with the present invention; and all correspondingly located windings in the arrays (P) are simultaneously "alerted" for possible inhibit pulsing. The latter is accomplished through the group address lines (A), (B) . . . (M), as aforesaid.

The output of each section switch S–*a*–1, S–*b*–1 . . . S–*m*–1 connects directly to its associated sectional inhibit winding W–*a*–1, W–*b*–1 . . . W–*m*–1. A current step-up transformer (TF) is used in each section switch output, in order to best match the load-current requirement of the windings (W) with the transistor (T) circuit capability. A diode D–*a* is in series with winding W–*a*–1; D–*b*, with W–*b*–1; etc. Section switch S–*a*–1 is fast-acting, utilizing a PNP transistor T–*a* as a coincident switch. Its collector is at the —V potential level, through the primary winding of output transformer TF–*a*. Its base is normally held at the +V level by its group address line (A), to which it is conductively connected through lead A–1 and dropping resistor R–*a*.

With the base of transistor T–*a* at the positive (+V) level, it is prevented from conducting, and no inhibit current can be passed into winding W–*a*–1. When the group line (A) is selectively addressed to the —V potentian level, the base of transistor T–*a* is thereupon made negative for one cycle (pulse) duration. In this state, the base becomes clamped to ground through the connected diode CL–*a* and held at a suitable negative bias, e.g.—0.3 volts. During such biased mode the transistor T–*a* is in readiness to be rendered conductive, and effect the current switching, when its emitter is made suitably positive by the connected inhibit line INH.–1. Selective operation of the inhibit switch S–1 provides such synchronous or coincident emitter voltage.

The inhibit switch S–1 comprises a PNP transistor $T_o$, the base of which is clamped to ground through diode $CL_o$. Its emitter is connected to the +V potential level through resistor $R_o$; its collector, to the —V level through resistor $R_o'$. The standby output of gate G–1 to the $T_o$ base is negative, while clamp diode $CL_o$ holds the base at a suitable negative bias, e.g.—0.8 volt. A constant predetermined current thereby flows through transistor $T_o$, resistor $R_o'$ to —V. Such is the standby circuit mode of operation of inhibit switch S–1. Typical potential levels for +V and —V are +22 volts and —22 volts respectively.

The inhibit line INH.–1 connects to the emitter of the transistor $T_o$, and is accordingly held close to the ground potential level during the standby conducting mode of units S–1, in view of the low drop from emitter to base.

The emitter of section switch transistor T–*a* is thus held at close to ground level while no inhibit pulse is required (in the coded write cycling operations) for the P–1 core array, as are those of the other section switches for P–1 namely S–*b*–1, S–*c*–1 . . . S–*m*–1. Such standby emitter biasing of the T–*a* (and T–*b*, T–*c* . . . T–*m*) transistors keeps them from conducting, despite any selective group line (A, B . . . M) biasing of their bases to the —V level. A similar standby operational mode is maintained in the inhibit switches S–2, . . . S–*n* for the arrays P–2 . . . P–*n*, and their associated section switches S–*a*, S–*b*, S–*c* . . . S–*m*.

When it is desired to impress an inhibit pulse into any of the respective arays P–1, P–2 . . . P–*n*, their associated inhibit switches (S) are impressed with a positive pulse through the input gates (G). This is accomplished through the input lines to the AND gates G–1 for switch S–1, and correspondingly for the others. When all the input lines coincide with their input signals into particular AND gates, they are arranged to produce a corresponding output pulse. Thus, the positive pulse output of gate G–1 passes to the base of transistor $T_o$, and is sufficiently positive to cut-off its standby current flow. The transistors $T_o$ of the inhibit switches (S) that are so impressed are rendered non-conducting for the duration of their positive input inhibit signal pulses.

While the standby current flow through a transistor $T_o$ is thus cut-off, substantially the full +V potential returns to the emitter through resistor $R_o$, and thereby making the inhibit line (INH.) positive. In this way, a positive output signal pulse is derived from inhibit switch (S–1) that is directly applied to the emitters connected to the inhibit control line (INH.–1). However, only that section switch (S–*a*–1, S–*b*–1 . . . S–*m*–1) which simultaneously has an addressed group —V pulse applied from group leads A, B . . . M will respond to the positive inhibit line signal pulse.

The result is a coincident "steering" of inhibit current directed from the standby current of switch S–1 upon gate G–1 actuation into the transistor of the selectively group addressed section switch: T–*a*, T–*b*, T–*c* . . . T–*m*. The transistor switching rate is only a small fraction of a micro-second, as 0.2 $\mu$s. Hence, inhibit pulse durations of, for example 3 $\mu$s. are substantially unaffected as to shape or phase in the invention fast switching arrangement.

By connecting the indicated +V and —V terminals of each array circuit to common terminals of a power supply, the loading thereof remains substantially uniform, making for simplified effective filtering. Further, the current step-up transformers (TF) match to the inhibit winding (W) requirement for more effective utilization of available power from the inhibit switching circuitry.

Although this invention has been set forth in connection with an exemplary form thereof, it is to be understood that modifications may be made within the broader spirit and scope of the invention as stated in the accompanying claims.

I claim:

1. A memory system comprising a plurality of arrays, each array being assembled into a number of sections with an inhibit winding individual to each section, a section switch connected with each of said windings for selectively impressing inhibit current therethrough, an inhibit line individual to each of said arrays coupled to all the section switches of its associated array, a group address line common to each group of correspondingly located sections of said arrays and coupled to all the section switches of its associated group of sections, circuit means for impressing inhibit signals in said inhibit lines, and address means for impressing control signals selectively in said group address lines, each of said section switches being arranged to pass inhibit current into its connected inhibit winding upon coincidence of address and inhibit signals impressed thereon.

2. A memory system comprising a plurality of arrays, each array being assembled into a number of sections with an inhibit winding individual to each section, a section switch with an output connected with each of said windings for selectively impressing inhibit current pulses therethrough, an inhibit line individual to each of said arrays coupled to a control input of all the section switches of its associated array, a group address line common to each group of correspondingly located sections of said arrays and coupled to a second control input of all the section switches of its associated group of sections, inhibit circuit means for impressing inhibit current pulses in coded relation in said inhibit lines, and address circuit means for impressing control pulses selectively in said group address lines, each of said section switches being arranged to pass inhibit current into its connected inhibit winding upon coincidence of address and inhibit pulses impressed upon its said inputs, whereby inhibiting operation is effected in said arrays in correspondence with the coded inhibit input and in the array sections thereof as selectively addressed in consonance therewith.

3. A memory system comprising a plurality of arrays of magnetic cores in coincident current arrangement, each array being assembled into a number of sections with an inhibit winding individual to each section, a section switch connected with each of said windings for selectively impressing inhibit current pulses therethrough, an inhibit line individual to each of said arrays coupled to all the section switches of its associated array, a group address line common to each group of correspondingly located sections of said arrays and coupled to all the section switches of its associated group of sections, inhibit circuit means for impressing inhibit current pulses in coded trains in said inhibit lines, and address circuit means for impressing control signals selectively in said group address lines, each of said section switches being arranged to pass rated inhibit current pulses into its connected inhibit winding during the coincidence of address and inhibit signals impressed upon its said inputs, whereby inhibiting operation is effected in said arrays in correspondence with the coded inhibit input and in the array sections thereof as selectively addressed in consonance with the locations of the magnetic cores to be inhibited.

4. A memory system comprising a plurality of arrays of magnetic cores in coincident current arrangement, each array being assembled into a like number of sections with an inhibit winding individual to each section, a section switch with an output connected with each of said windings for selectively impressing inhibit current pulses therethrough, an inhibit line individual to each of said arrays coupled to a control input of all the section switches of its associated array, a group address line common to each group of correspondingly located sections of said arrays and coupled to a second control input of all the section switches of its associated group of sections, inhibit circuit means for impressing inhibit current pulses in coded trains in said inhibit lines, and address circuit means for impressing control pulses selectively in said group address lines, each of said section switches being arranged to pass rated inhibit current pulses into its connected inhibit winding during the coincidence of address and inhibit signal pulses impressed upon its said inputs, whereby inhibiting operation is effected in said arrays in correspondence with the coded inhibit input and in the array sections thereof as selectively addressed in consonance with the locations of the magnetic cores to be inhibited.

5. A memory system as claimed in claim 1, in which each section switch comprises a transistor with one electrode connected to its associated inhibit line and another electrode connected to its associated group address line, and said inhibit circuit means contains an inhibit switch connected to each inhibit line.

6. A memory system as claimed in claim 2, in which each section switch comprises a transistor with one electrode connected to its associated inhibit line and another electrode connected to its associated group address line, said address circuit means being arranged to normally bias each transistor to the cut-off mode and impress an operational bias to the transistors as they are group addressed through the associated group address line, said inhibit circuit means containing an inhibit switch connected to each inhibit line, each inhibit switch being arranged with a standby current, the standby current of each inhibit switch being redirected into the connected section switch transistor upon the said coincidence of the address and inhibit pulses.

7. A memory system as claimed in claim 3, in which each section switch comprises a transistor with one electrode connected to its associated inhibit line and another electrode connected to its associated group address line, said inhibit circuit means containing an inhibit switch connected to each inhibit line, each inhibit switch comprising a transistor arranged with a standby current, the standby current of each inhibit switch being redirected into the connected section switch transistor and thereupon into the associated inhibit winding upon the said coincidence of the address and inhibit signals.

8. A memory system as claimed in claim 4, in which each section switch comprises a transistor with its emitter electrode connected to its associated inhibit line and its base electrode connected to its associated group address line, a diode clamping each of said transistor bases at a predetermined bias level, said address circuit means being arranged to normally bias the base electrode of each transistor to the cut-off mode and impress an operational bias to the transistors as they are group addressed through the associated group address line, said inhibit circuit means containing an inhibit switch connected to each inhibit line, each inhibit switch comprising a transistor arranged with a standby current, the standby current of each inhibit switch being redirected into the connected section switch transistor emitter electrode and thereupon into the associated inhibit winding upon the said coincidence of the address and inhibit pulses.

References Cited by the Examiner

UNITED STATES PATENTS

| | | | |
|---|---|---|---|
| 2,882,517 | 4/59 | Warren | 340—174 |
| 2,911,631 | 11/59 | Warren | 340—174 |
| 2,920,315 | 1/60 | Markowitz et al. | 340—174 |
| 3,008,129 | 11/61 | Katz | 340—174 |
| 3,027,546 | 3/62 | Howes et al. | 340—174 |

IRVING L. SRAGOW, *Primary Examiner.*